(12) United States Patent
Jordan et al.

(10) Patent No.: US 8,514,124 B2
(45) Date of Patent: Aug. 20, 2013

(54) METHOD FOR OPERATING A RADAR SYSTEM IN THE EVENT OF POSSIBLE CONCEALMENT OF THE TARGET OBJECT AND RADAR SYSTEM FOR PERFORMING THE METHOD

(75) Inventors: Ruediger Jordan, Stuttgart (DE); Oliver Schwindt, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 588 days.

(21) Appl. No.: 12/517,871

(22) PCT Filed: Oct. 11, 2007

(86) PCT No.: PCT/EP2007/060840
§ 371 (c)(1),
(2), (4) Date: Nov. 10, 2010

(87) PCT Pub. No.: WO2008/068088
PCT Pub. Date: Jun. 12, 2008

(65) Prior Publication Data
US 2011/0063157 A1    Mar. 17, 2011

(30) Foreign Application Priority Data
Dec. 5, 2006   (DE) .......................... 10 2006 057 277

(51) Int. Cl.
*G01S 13/00*   (2006.01)
(52) U.S. Cl.
USPC .......................................................... 342/22

(58) Field of Classification Search
USPC .......................................................... 342/22
See application file for complete search history.

(56) References Cited

U.S. PATENT DOCUMENTS

| | | | |
|---|---|---|---|
| 6,147,637 A | 11/2000 | Morikawa et al. | |
| 2005/0034036 A1 | 2/2005 | Lages et al. | |

FOREIGN PATENT DOCUMENTS

| | | |
|---|---|---|
| DE | 101 41 055 | 3/2003 |
| EP | 1 267 178 | 12/2002 |
| EP | 1 298 012 | 4/2003 |
| WO | WO 03/031217 | 4/2003 |

OTHER PUBLICATIONS

International Preliminary Report on Patentability, PCT/EP2007/060840, Jul. 7, 2009.*
Internation Search Report for PCT/EP2007/060840, dated Jan. 30, 2008.

* cited by examiner

*Primary Examiner* — Jack W Keith
*Assistant Examiner* — Frank J McGue
(74) *Attorney, Agent, or Firm* — Kenyon & Kenyon LLP

(57) ABSTRACT

In a method for operating a radar system and a radar system for performing the method, in particular a microwave radar system for applications in or on motor vehicles, in which at least one target object and at least one possible concealing object are detected using radar technology, it is provided in particular that a detection is made of whether a concealment situation of the at least one target object by the at least one concealing object exists, and in the case of a detected concealment situation a loss of the target object is not automatically assumed.

12 Claims, 2 Drawing Sheets

METHOD FOR OPERATING A RADAR SYSTEM IN THE EVENT OF POSSIBLE CONCEALMENT OF THE TARGET OBJECT AND RADAR SYSTEM FOR PERFORMING THE METHOD

FIELD OF THE INVENTION

The present invention relates to a method for operating a radar system, in particular a microwave radar system, for applications in or on motor vehicles, as well as a radar system for performing the method.

BACKGROUND INFORMATION

Radar systems using electromagnetic waves, in particular using microwaves having frequencies over 100 MHz, are widely known and are used for detecting objects and for determining velocities, distances, and directions of these objects.

The use of such radar systems in a motor vehicle for detecting the positions of preceding vehicles and possibly for lane assignment of these preceding vehicles is known.

A directional antenna provided in the particular radar system and having a radar sensor measures, in a manner essentially known, reflexes from waves incident on an object to be sensed (target object). The directional antenna may detect the object only if the direct path between the radar sensor and the target object is not concealed by another object or a plurality of other objects.

A target object may be concealed by another object in vehicle traffic, for example, in a sharp right curve of the highway, where the host vehicle moves in the left-hand lane behind a target vehicle at a relatively great time interval or approaches the latter, specifically in the case where another vehicle, for example, a truck, is moving in the right-hand lane and at least partially blocks the direct view between the radar sensor and the target vehicle, which therefore cannot be detected.

In the known radar systems, a radar sensor is now situated approximately in the vehicle center, preferably in the center of the vehicle's bumper, and the driver thus sits to the left of the sensor. This may cause the driver to be still able to see the target vehicle, although it is already concealed by the other vehicle for the radar sensor. In such a scenario, the target object is often lost, which is puzzling to the driver because of the target vehicle still being detected by the driver.

A concealment situation as just described occurs, for example, in traffic jams involving a plurality of vehicles and it often happens that potentially relevant target vehicles are briefly concealed by other vehicles even before they become relevant.

It is therefore desirable to improve the above-described radar system in such a way that measurement results that are puzzling or contradictory to the driver are avoided.

SUMMARY OF THE INVENTION

The present invention is based on the idea of improving the tracking of a target object with the aid of a radar system of the present invention by recognizing whether a concealment situation with respect to the target object exists and, in the event of a recognized concealment situation, not automatically assuming a loss of the target object.

Such a concealment situation is preferably handled by checking the plausibility of the existence of such a concealing object, a plausibility value (i.e., "plausibility of the object") being increased or incremented if the radar system detects or, after the occurrence of a concealment, redetects, preferably in one measurement cycle, a tracked object, referred to hereinafter as "target object," the plausibility value being decreased or decremented if the radar system, preferably in one measurement cycle, detects no radar reflexes of the object. If the current plausibility value is less than a lower empirically predefinable threshold value, it is assumed that the target object has totally disappeared, since no reflexes have been detected for a longer time period. Only in this case is the target object deleted from the detection and thus no longer tracked. Using this procedure, the target object is thus not automatically deleted if it has not been detected within one measurement cycle.

According to the present invention, the plausibility of a target object is decreased more slowly since, in the event of a possible concealment situation, the target object cannot be detected, although it is actually still there.

It may furthermore be provided that the increments for the above-mentioned increase or decrease of the plausibility values of a target object be made a function of the sensitivity or measurement resolution of the particular radar sensor used, which substantially increases the reliability of the radar system.

Due to the present invention, a target object is assumed as existing for a longer time, and in most cases is detected again by the radar sensor after a short time interval. In the meantime, the target object is communicated to the driver as still existing and thus does not result in the intermediate result described above, which is puzzling to the driver. The above-described unjustified target object losses are thus avoidable and a result that is better understandable to the driver is obtained.

The above-mentioned recognition of a concealment situation occurs according to the present invention preferably by evaluating the relative position of the detected objects with respect to each other and by marking objects that are possibly concealed by other objects. The resulting information is preferably further processed in the above-named or an alternative plausibility algorithm to slow down or totally suppress the decrease in the plausibility value for the target object in the event of a recognized concealment.

DETAILED DESCRIPTION

Figure 1:
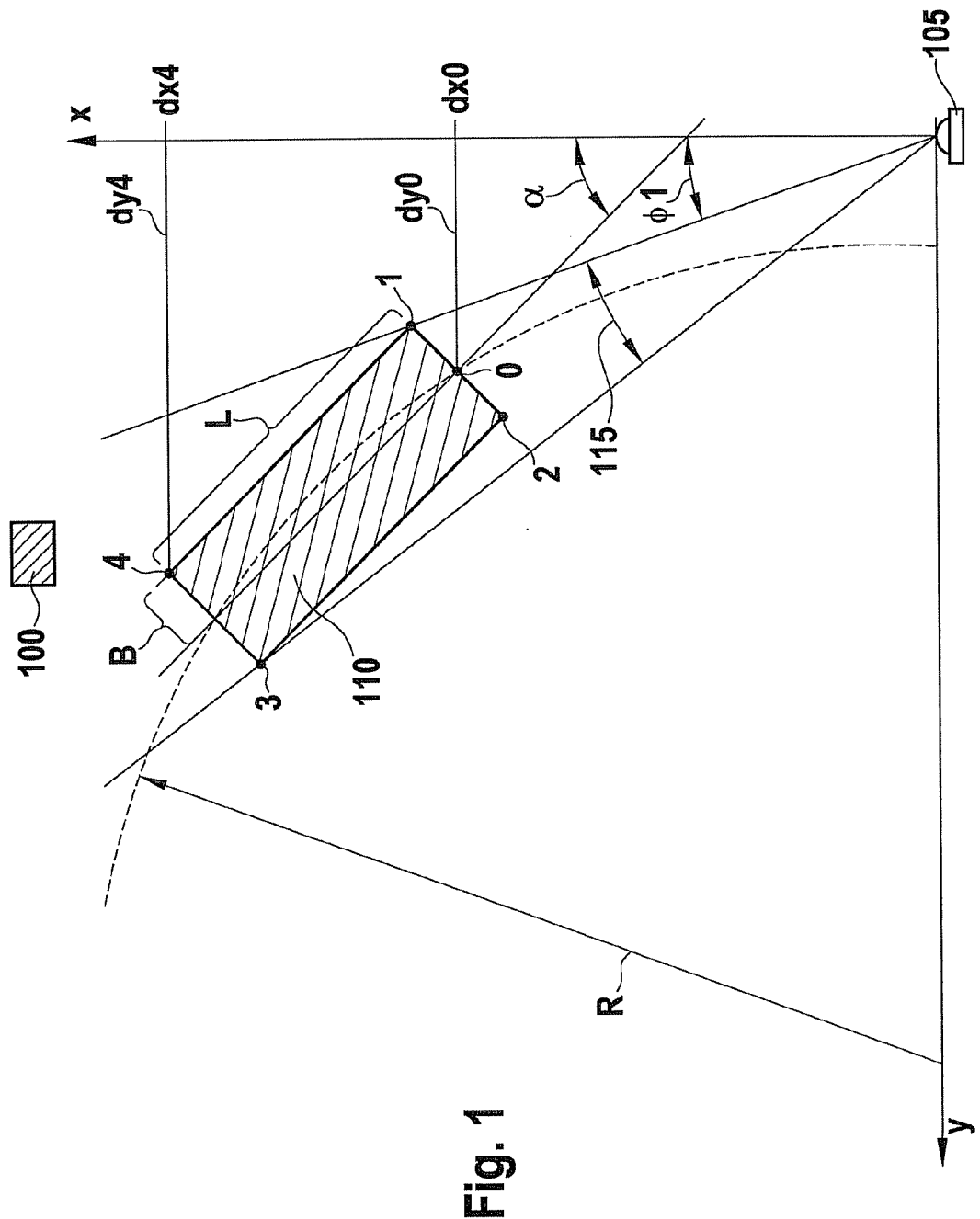
FIG. 1 schematically shows the geometric relationships when calculating a concealment situation according to a preferred specific embodiment of the present invention.

FIG. 1 schematically shows the preferred procedure according to the present invention in the case of a purely geometric calculation of a concealment situation of a target object 100. The assumed position of a radar sensor is labeled with the reference numeral 105. Furthermore, an object 110, situated in the measuring field of radar sensor 105 and concealing target object 100, is assumed.

It is assumed that concealing object 110 has a rectangular object footprint having width 2*B and length L. The purpose of the concealment detection is to determine angles $\phi 1$ through $\phi 4$ of all four corners of object 110 and to determine the minimum and maximum of these angles (in the figure only angle $\phi 1$ is shown for the sake of clarity). Objects further removed, which are situated between these two angles, in the present case the two angles φ1 and φ3, are affected by this concealment.

Relative angle α of object 110 may be estimated by different methods, for example via eigenradius R, also shown in FIG. 1.

Variables dx0 and dy0 are the coordinates of concealing object 110, as provided by known algorithms for determining the position of objects (so-called "tracking algorithms").

The computations to be derived from FIG. 1 are based on the two above-mentioned variables R and α. Eigenradius R may be computed according to FIG. 1 from the host vehicle's velocity v_ego and its yaw rate psidt_ego, according to the relationship R=v_ego/psidt_ego. Relative angle α of object 110 results, according to FIG. 1, from the relationship α=arcsin(dx0/R).

Using coordinate transformation, the following relationships are obtained for angles φ1 through φ4:

$$dx1 = dx0 + \cos(\alpha)*0 - \sin(\alpha)*(-B)$$

$$dy1 = dy0 + \sin(\alpha)*0 + \cos(\alpha)*(-B)$$

$$\phi1 = \arctan(dy1/dx1)$$

$$dx2 = dx0 + \cos(\alpha)*0 - \sin(\alpha)*(+B)$$

$$dy2 = dy0 + \sin(\alpha)*0 + \cos(\alpha)*(+B)$$

$$\phi2 = \arctan(dy2/dx2)$$

$$dx3 = dx0 + \cos(\alpha)*L - \sin(\alpha)*(+B)$$

$$dy3 = dy0 + \sin(\alpha)*L + \cos(\alpha)*(+B)$$

$$\phi3 = \arctan(dy3/dx3)$$

$$dx4 = dx0 + \cos(\alpha)*L - \sin(\alpha)*(-B)$$

$$dy4 = dy0 + \sin(\alpha)*L + \cos(\alpha)*(-B)$$

$$\phi4 = \arctan(dy4/dx4)$$

As mentioned previously, finally the concealment angle "φ_concealment 115" results, according to the relationship φ_concealment=[min(φ1 ... φ4); max(φ1 ... φ4)]. All objects having an angle situated in the area of φ_concealment are possibly affected by the concealment.

Figure 2:
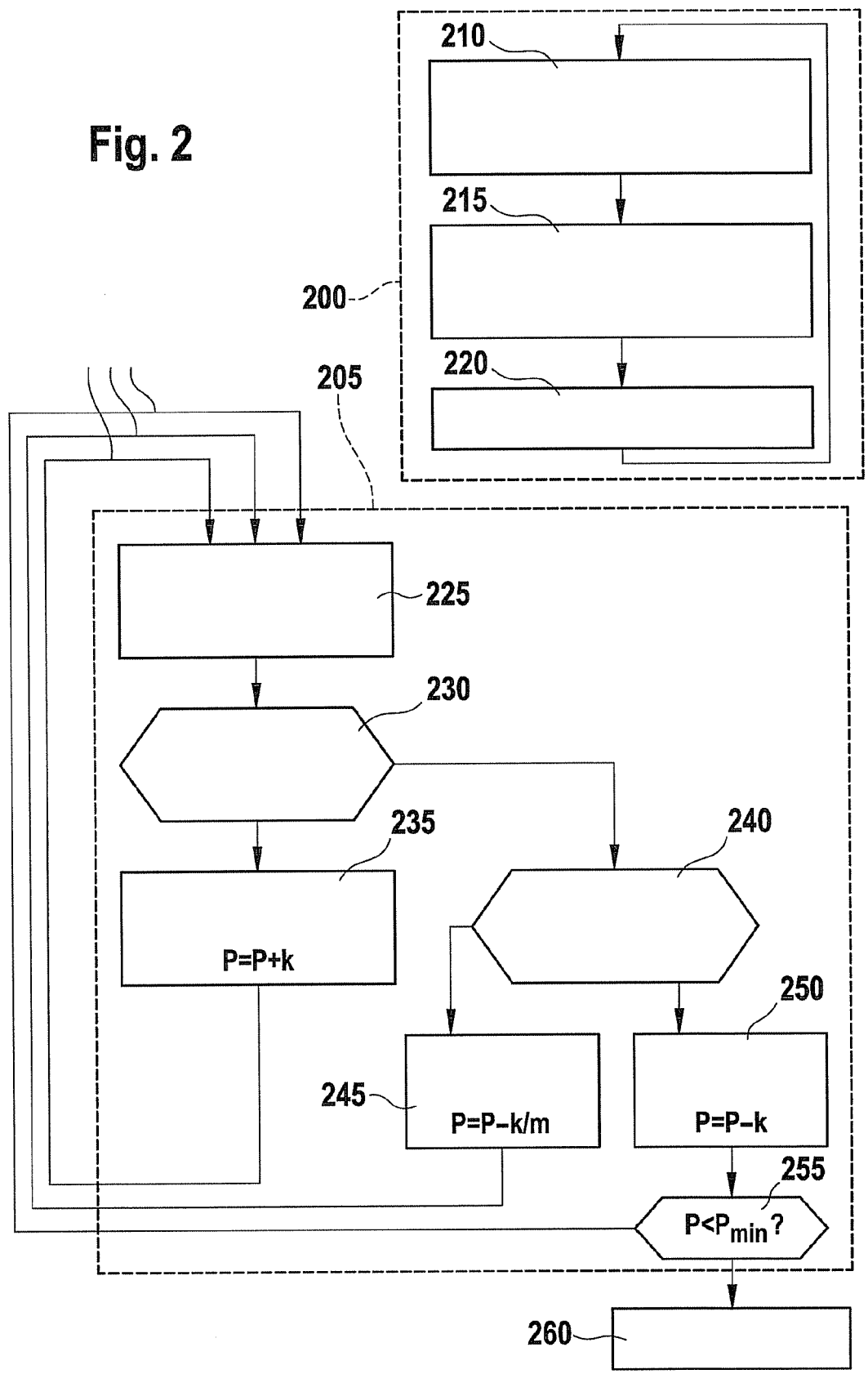
FIG. 2 shows a preferred specific embodiment of the method according to the present invention using a flow chart.

FIG. 2 describes a preferred procedure according to the present invention when operating a radar system referenced herein in the event of an assumed concealment situation.

The procedure shown there, which may be implemented, for example, as a control code of a radar control unit or in the form of a special circuit, for example, in a motor vehicle, is composed of two subroutines 200 and 205 running, in the present example, independently of and/or parallel to each other. However, it is understood that, basically, first subroutine 200 may also be implemented as part of second subroutine 205, for example, between steps 225 and 230 of the latter.

First subroutine 200 carries out, preferably as a loop as described in FIG. 1, an evaluation 210 of the relative position of the objects (i, j, k, ...) actually located in the measuring field of the radar system. In the following step 215, those objects j, which are possibly concealed by other objects k, are marked as "possibly concealed" based on the result of this evaluation 210, and objects k thus marked are buffered 220. This buffered concealment-relevant information is used in subroutine 205 here running independently and/or parallel as described below.

Second subroutine 205 includes preferably executed process steps for performing the above-named plausibility check procedure. Process steps 225 through 255 shown within dashed line 205 represent the steps of an nth measurement cycle of the basic radar system and are iterated with the aid of the loop shown until step 260 is executed, which ends the entire subroutine 205.

It should be pointed out that the use of the plausibility check procedure described below is only preferred, and the general inventive idea of the present invention is basically also applicable in other methods such as, for example, in computing the probability of existence of an object $P_{exist}$.

In the nth measurement cycle shown here, in a first step 225, a certain target object is measured, i.e., tracked with the aid of a radar sensor of the radar system having a directional antenna. It is understood that the depicted measurement cycle may also be used in parallel for a plurality of target objects to thus track a plurality of target objects simultaneously.

In a following processing step 230, a check is performed as to whether the target object has been detected. If this is the case, the current plausibility value P for the target object is incremented in step 235 by an empirically predefinable value k and a jump is performed back to beginning 225 of subroutine 205 to perform the (n+1)th measurement cycle on the present target object. Step 235 is, however, executed only if the condition $P < P_{max}$=const. is met.

If the target object could not be detected by the radar sensor according to step 230, a check is first performed in step 240 of whether the target object is saved as "possibly concealed" 220. If this is the case, plausibility P is decremented in step 245, i.e., reduced by a value k/m, the value of m being empirically selected in such a way that this decrementation of P is performed more slowly, i.e., in any case the condition m>1 applies.

In the case where the target object is recognized as not "possibly concealed" in step 240, the plausibility of the target object is reduced in step 250 by the full value k, since the non-detection of the target object is most probably not caused by concealment. In this case, a check is still performed in a following step 255 of whether the new value of P is smaller than an empirically predefinable minimum value $P_{min}$. If this condition is not met, a jump is made again back to beginning 225 of subroutine 205. However, if condition 255 is met, the target object is deleted 260, since it is now to be assumed that the target object has left the measuring range of the radar system and therefore no longer has to be detected.

It is to be pointed out that alternatively a check according to step 255 may be performed also after step 245; it is a function in particular of the magnitude of value m, since only for larger decrements of plausibility P, i.e., for relatively small values of m, may the relationship $P < P_{min}$ be met even in path 245.

With the aid of the above-described procedure, the above-described target object losses, which occur in particular in the event of at least three vehicles following each other when traveling in a multilane curve such as, for example, a preceding target vehicle, followed by another vehicle, and the host vehicle following the two above-mentioned vehicles, are effectively prevented.

In the specific embodiment shown in FIG. 2, the above-described plausibility check of a target object is performed by computing the probability of existence $P_{exist}$ of the target object. In this case, essentially the two probabilities are processed, namely the probability (P(D|H1)) of measuring, i.e., detecting, the target object, and the probability P(D|H0) of an erroneous measurement in the detection.

According to a preferred exemplary embodiment, the value of the probability of existence $P_{exist}$ is computed on the basis of the following equations:

$$P_{exist/k} = LR_k/(1+LR_k)$$

where $LR_k$ is the likelihood ratio measured in a cycle number k.

The value of $LR_k$ is computed in this exemplary embodiment from the following equations:

$$LR_k = \min[P(D|H1)/P(D|H0)*LR_{k-1}; LR_{max}],$$

if the target object has been detected and $$LR_k = \min[(1-P(D|H1))/(1-P(D|H0))*LR_{k-1}; LR_{max}],$$

if no target object has been detected,
where $P(D|H1)$ denotes the above-mentioned measurement probability, $P(D|H0)$ the above-mentioned erroneous measurement probability, and $LR_{max}$ the maximum value of LR.

In the above-mentioned algorithm, a concealment situation is taken into account as follows: In the case of a suspected concealment, $P(D|H1)$ is reduced. The exact value of the reduction may be ascertained in an essentially known manner by statistical methods. It is higher or lower depending on the degree of concealment. Since radar sensors are fully capable of measuring even under vehicles, the value of the measurement or detection probability $P(D|H1)$ will not drop to the value "0."

Deletion of target objects is also preferably handled as mentioned previously via the probability of existence P. In this case, however, no further algorithmic measures are necessary.

What is claimed is:

1. A method for operating a radar system, comprising:
   detecting, by a radar sensor, at least one target object and at least one possible concealing object;
   determining, by a computer processor, a likelihood of a concealment situation in which that the at least one possible concealing object conceals the at least one target object;
   wherein:
      in the case of a recognized concealment situation, if the at least one target object is not detected by the radar system, the processor attributes the non-detection of the at least one target object to the concealment situation and not to a loss of the at least one target object;
      the concealment situation is ascertained with the aid of plausibility checking of the existence of the at least one concealing object, the plausibility checking including increasing, by the processor, a plausibility value when the radar system detects or, after a concealment that occurred, redetects the at least one target object, and decreasing, by the processor, the plausibility value when the radar system does not detect the at least one target object; and
      the method comprises decreasing, by the processor, a plausibility value of a non-detected target object recognized as possibly concealed more slowly than that of a non-detected target object which is not recognized as possibly concealed.

2. The method according to claim 1, wherein the radar system is a microwave radar system for applications in or on a motor vehicle.

3. The method according to claim 1, wherein only in the case where a current plausibility value is less than a lower empirically predefinable threshold value is it assumed that the at least one target object has left a measuring range of the radar system and, in this case, the at least one target object is deleted from a set of target objects detected by the radar system.

4. The method according to claim 1, wherein the recognition of the concealment situation includes evaluating a relative position of the at least one target object and the at least one concealing object to one another.

5. The method according to claim 1, wherein the plausibility check is performed with the help of a probability of existence.

6. A method for operating a radar system, comprising:
   detecting, by a radar sensor, at least one target object and at least one possible concealing object;
   determining, by a computer processor, a likelihood of a concealment situation in which that the at least one possible concealing object conceals the at least one target object;
   wherein:
      in the case of a recognized concealment situation, if the at least one target object is not detected by the radar system, the processor attributes the non-detection of the at least one target object to the concealment situation and not to a loss of the at least one target object;
      the concealment situation is ascertained with the aid of plausibility checking of the existence of the at least one concealing object, the plausibility checking including increasing, by the processor, a plausibility value when the radar system detects or, after a concealment that occurred, redetects the at least one target object, and decreasing, by the processor, the plausibility value when the radar system does not detect the at least one target object; and
      particular increments for increasing or decreasing the plausibility value of the at least one target object are made a function of at least one of a measurement resolution and a sensitivity of the radar system.

7. The method according to claim 6, wherein only in the case where a current plausibility value is less than a lower empirically predefinable threshold value is it assumed that the at least one target object has left a measuring range of the radar system and, in this case, the at least one target object is deleted from a set of target objects detected by the radar system.

8. The method according to claim 6, wherein the radar system is a microwave radar system for applications in or on a motor vehicle.

9. The method according to claim 6, wherein the recognition of the concealment situation includes evaluating a relative position of the at least one target object and the at least one concealing object to one another.

10. A method for producing output of a radar system that includes a radar sensor and a computer processor, the method comprising:
    detecting, by the radar sensor, at least one target object and at least one possible concealing object;
    determining, by the processor, a likelihood of a concealment situation in which that the at least one possible concealing object conceals the at least one target object, the determining being based on an evaluation, by the processor, of a relative position of the at least one possible concealing object and the at least one target object to each other; and
    producing a radar detection output, by the processor, based on the likelihood determination;
    wherein:
       in the case of a recognized concealment situation, if the at least one target object is not detected by the radar system, the processor attributes the non-detection of the at least one target object to the concealment situation and not to a loss of the at least one target object; and the at least one possible concealing object is assumed by the processor to be rectangular or square, the likelihood of the concealment situation being computed by the processor by:
- determining angles of four corners of the at least one possible concealing object relative to a position of the radar sensor of the radar system; and
- computing minimum and maximum angles from the four angles, objects situated between the computed minimum and maximum angles being assumed by the as affected by a concealment.

11. The method according to claim 10, wherein the concealment situation is ascertained with the aid of plausibility checking of the existence of the concealing object, and the method further comprises increasing a plausibility value when the radar system detects or, after a concealment that occurred, redetects the at least one target object, and decreasing the plausibility value when the radar system does not detect the at least one target object.

12. A radar system comprising:
- means for detecting a possible concealment situation of at least one target object by at least one concealing object, and in the case of a recognized concealment situation if the target object is not detected by the radar system, a loss of the target object is not automatically assumed; and
- means for performing a plausibility check of an existence of the concealing object, a plausibility value being increased when the radar system detects or, after a concealment that occurred, redetects the target object, and the plausibility value being decreased when the radar system does not detect the target object;
- wherein a non-detected target object recognized as possibly concealed has its plausibility decreased more slowly by the means for performing than that of a non-detected target object which is not recognized as possibly concealed.

* * * * *

UNITED STATES PATENT AND TRADEMARK OFFICE
CERTIFICATE OF CORRECTION

PATENT NO. : 8,514,124 B2
APPLICATION NO. : 12/517871
DATED : August 20, 2013
INVENTOR(S) : Jordan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1112 days.

Signed and Sealed this

Fifteenth Day of September, 2015

Michelle K. Lee
*Director of the United States Patent and Trademark Office*